United States Patent [19]

Fettig

[11] Patent Number: 5,075,954

[45] Date of Patent: Dec. 31, 1991

[54] AUTOMATIC DRILLING MACHINE

[76] Inventor: Pascal Fettig, 822 S. Washington, Crawfordsville, Ind. 47933

[21] Appl. No.: 589,455

[22] Filed: Sep. 27, 1990

[51] Int. Cl.[5] ........................ B23Q 39/02; B23B 47/18

[52] U.S. Cl. ........................................ 29/563; 408/31

[58] Field of Search ............. 29/563, 564, 37 R, 33 P, 29/26 A; 408/49, 50, 31, 37, 43, 42, 44, 25, 26; 144/3 A, 356, 242 M, 245 A, 245 B; 409/159, 164

[56] References Cited

U.S. PATENT DOCUMENTS

| | | | |
|---|---|---|---|
| 2,344,053 | 3/1944 | O'Callaghan | 408/50 |
| 2,518,813 | 8/1950 | Pearson | 29/37 R |
| 2,864,416 | 12/1958 | Sherwood | 408/49 |
| 3,007,500 | 11/1961 | Halicki | 408/10 |
| 3,515,017 | 6/1970 | Ulrich | 408/37 X |
| 3,565,142 | 2/1971 | McQueston | 408/25 |
| 3,841,784 | 10/1974 | Mengerinhausen | 29/563 X |
| 4,112,986 | 9/1978 | Strange et al. | 144/356 |
| 4,173,238 | 11/1979 | Pryor | 144/356 |
| 4,243,081 | 1/1981 | Pritelli | 144/3 A |
| 4,326,572 | 4/1982 | Ingram et al. | 144/371 |
| 4,338,710 | 7/1982 | Stursa et al. | 29/26 A |
| 4,410,025 | 10/1983 | Sicotte | 29/563 |
| 4,443,937 | 4/1984 | Dominici et al. | 29/564 X |
| 4,868,960 | 9/1989 | Takagi et al. | 29/33 P |

FOREIGN PATENT DOCUMENTS

| | | | |
|---|---|---|---|
| 1128260 | 4/1962 | Fed. Rep. of Germany | 29/563 |
| 2351180 | 5/1974 | Fed. Rep. of Germany | 408/44 |
| 818856 | of 1981 | U.S.S.R. . | |

*Primary Examiner*—William Briggs
*Attorney, Agent, or Firm*—Ice Miller Donadio & Ryan

[57] ABSTRACT

An automatic drilling apparatus is provided for performing a drilling operation (such as routing) on a block. The drilling apparatus includes a track on which the block can travel. The track includes a receiving area adjacent to a first end of the track, and an operations area adjacent to a second send of the track. A generally vertical chute has a first end for receiving a block to be dispensed, and a second end disposed adjacent to the receiving area of the track for dispensing blocks onto the receiving area of the track. A block advancing device advances the block from the receiving area of the track to the operations area of the track. A selectively actuable side clamp is disposed adjacent to the operations area of the track. The side clamp mover moves the side clamp between a block-disengaged and a block-engaging position. A selectively actuable end plate is disposed adjacent to the second area of the track. An end plate mover moves the end plate between a block engaging position and a block disengaged position to permit ejection of the block from the track. A first and second drill are disposed adjacent to the operations area of the track. A first and second drill mover moves the first and second drill means between a block engaging position and a block disengaged position. A controller is provided for controlling the operation of the block advancing device, the side clamp mover, the end plate mover, the first drill mover and the second drill mover.

23 Claims, 7 Drawing Sheets

AUTOMATIC DRILLING MACHINE

TECHNICAL FIELD OF THE INVENTION

The present invention relates to an automatic drilling machine, and more particularly, to an automatic drilling machine for performing a drilling operation, such as routing, on a workpiece such as a wood block.

BACKGROUND OF THE INVENTION

In order to form a workpiece, such as a wooden block, into a finished product it is often necessary to perform an operation on the workpiece. For example, in the manufacture of furniture, a wooden workpiece must often be lathed, drilled and routed to transform the unfinished piece of wood into a finished furniture piece.

Wooden blocks have been used for quite some time as components of toys. Generally, the wooden block is processed to give the block some sort of feature that is required by the toy. Probably the most common example is a wooden block on which a letter is carved for use of the block as a part of a children's alphabet block set.

Another game using wooden blocks is BLOCKS AND MARBLES brand children's toy which is manufactured by BLOCKS AND MARBLES BRAND TOYS, INC. of Crawfordsville, Ind. The BLOCKS AND MARBLES game includes plurality of wooden blocks into which troughs, and tunnels have been formed to provide a path along which a marble can travel when the blocks are placed in an ordered array.

One block component of a BLOCKS AND MARBLES toy set is a generally cuboid block having an elbow-shaped tunnel formed therethrough. This elbow-shaped tunnel containing block can be arrayed with various trough-containing blocks and other tunnel-containing blocks to form a structure that provides an interconnected pathway down which a marble can travel.

As will be appreciated by those familiar with manufacturing wood-related products, it is often desirable to automate the process for forming a wooden workpiece into a finished product. By automating the production process, labor costs can be reduced, and quality control can be improved.

Several automatic wood processing devices exist. MacQueston U.S. Pat. No. 3,565,142 discloses to an automatic drilling machine for drilling round spindles. MacQueston's device includes a gravity feed hopper for holding the undrilled spindles. A pushing mechanism pushes the spindle past cutters to trim the ends of the spindle, until the spindle is above a V-shaped work holder against which the round spindle piece is clamped by clamps.

Strange, et al, U.S. Pat. No. 4,112,986 relates to an automatic device for dadoing cabinet panels and the like. In the STRANGE device, blank panels are manually positioned on the device before a routing operation is commenced. A pneumatic logic circuit is provided to control the router operation in response to manual settings and feedback signals.

Ingram, U.S. Pat. No. 4,326,572, relates to a wood molding routing apparatus for making a dental block-type wood molding having a series of evenly spaced notches along its length. The Ingram device feeds a long piece of molding a pre-determined distance and then cuts a series of notches by using multiple routers. The piece is then indexed an appropriate distance along its length so that the next section can be notched. This cycle is repeated until the entire length of molding is notched. The Ingram device uses some pneumatic switches to control its operations.

Pearson, U.S. Pat. No. 2,518,813 relates to an automatic stock working machine which can subject a single piece of stock to a plurality of machine operations such as forming, drilling, tapping and final cut off. The Pearson device uses a gang of tools which are non-rotatively mounted with respect to the position thereof, and a stock holding mechanism in which the stock is rotated and which itself is rotated upon an indexing operation to advance each piece of stock to the next succeeding tool. Pearson uses an electric circuit to control the operation of his device.

Halicki, et al U.S. Pat. No. 3,007,500 relates to a strip processing machine for automatically feeding, conveying, sawing, drilling, and unloading strip material. The Halicki device alternately conveys and saws strip material upon placement of the material on a feedway leading to a saw unit.

Pryor, U.S. Pat. No. 4,173,328, relates to an improved trimmer section for use in a saw mill. The Pryor device includes means for automatically selecting timbers and the like to be trimmed, and for automatically routing trimmed timbers to one of several different storage and loading points in the saw mill. The timber is automatically transferred through several stages of mechanical manipulation to the designated station.

Pritelli, U.S. Pat. No. 4,243,081, relates to an automatic device for machining panels or similar articles, and particularly for drilling and milling them in accordance with the "Folding" system.

Novozhilov, Soviet Inventors Certificate No. 818,856, relates to an electrical priority logic unit for use in connection with a hydraulically actuated device.

Although the devices discussed above most likely perform their intended functions in a workmanlike manner, room for improvement exists. In particular, none of the devices discussed above appears to be well suited for performing an operation on a wooden block.

It is therefore one object of the present invention to provide a machine which automatically performs a two-stage drilling operation on a wooden block.

SUMMARY OF THE INVENTION

In accordance with the present invention, an automatic drilling apparatus is provided for performing a drilling operation (such as routing) on a block. The drilling apparatus includes a track on which the block can travel. The track includes a receiving area adjacent to a first end of the track, and an operations area adjacent to a second end of the track. A generally vertical chute means has a first end for receiving a block to be dispensed, and a second end disposed adjacent to the receiving area of the track for dispensing blocks onto the receiving area of the track. A block advancing means advances the block from the receiving area of the track to the operations area of the track. A selectively actuable side clamp means is disposed adjacent to the operations area of the track. A side clamp moving means moves the side clamp means between a block-disengaged and a block-engaging position. A selectively actuable end plate means is disposed adjacent to the second end of the track. An end plate moving means moves the end plate between a block engaging position and a block disengaged position to permit ejection of the block from the track. A first drill means is disposed adjacent to the operations area of the track. A first drill moving means moves the first drill means between a block engaging position and a block disengaged position. A second drill means is disposed adjacent to the operations area of the track. A second drill moving means moves the second drill means between a block engaging position and block disengaged position. A control means is provided for controlling the operation of the block advancing means, the side clamp moving means, the end plate moving means, the first drill moving means, and the second drill moving means.

Preferably, the block advancing means includes a selectively actuable push rod means and a push rod moving means for moving the push rod along the track. The push rod includes an upstanding leg disposed generally perpendicular to the track. The upstanding leg is coupled to the push rod moving means. The push rod also includes a supine leg disposed generally parallel to the track. The supine leg is sized and positioned to pass between the second end of the chute means and the track.

Additionally, a series of limit valves and a pneumatic logic circuit are provided. The limit valves are provided for sensing the position of the various movable components of the device, and for sending a response through the pneumatic circuit to others of the movable components to cause the other movable components to either begin movement or cease movement, as appropriate.

Also, in accordance with the present invention a method is disclosed for processing a block to form an elbow-shaped tunnel therethrough having a generally vertical portion and a generally horizontal portion. The method comprises the steps of placing a plurality of pre-cut blocks into a chute means. The blocks are dispensed from an end of the chute means onto a track. The blocks are advanced to an operations area of the track with a block advancing means. The position of the blocks are fixed in the operations area of the track with a side clamp means, and end plate means and the block advancing means. A generally vertical bore is drilled through the block with the first drill means to form the generally vertical portion of the elbow-shaped tunnel. A generally horizontal bore is drilled through the block with a second drill means to form the generally horizontal portion of the elbow-shaped tunnel. The block advancing means then retracts to enable the block advancing means to move to another block. The end plate means is retracted to permit the block to be ejected from the track. The operation of the block advancing means, end plate means, side clamp means, first drill means and second drill means are controlled with a fluid logic circuit.

Preferably, the side clamp means is allowed to move into a block engaging position in response to movement of the block advancing means. The first drill means is prohibited from moving into a block engaging position unless the second drill means is in a predetermined position.

One feature of the present invention is that the device of the present invention provides means for automatically advancing blocks from a feed chute to an operations area of a track, clamping the block in place in the operations area, drilling the block with the first and second drill, and then ejecting the block from the operations area of the track. This feature has the advantage of automating a process previously performed manually. By automating the process, the quality of the blocks produced has increased, and the labor required to produce the blocks has been reduced substantially.

Another feature of the present invention is that a control means is provided that determines the positions the various components of the device at various points in the cycle, and actuates (or prevents actuation) of those other components based on those predetermined positions. This feature has the advantage of ensuring a proper sequencing of operations of the components during a cycle. Additionally, by preventing actuation of certain components in response to the position of other components, the safety of the device is enhanced. These and other features of the present invention will become apparent to those skilled in the art upon review of the detailed description of a preferred embodiment presented below which represents the best mode perceived presently of practicing the invention.

DETAILED DESCRIPTION OF PREFERRED EMBODIMENTS

Figure 1:
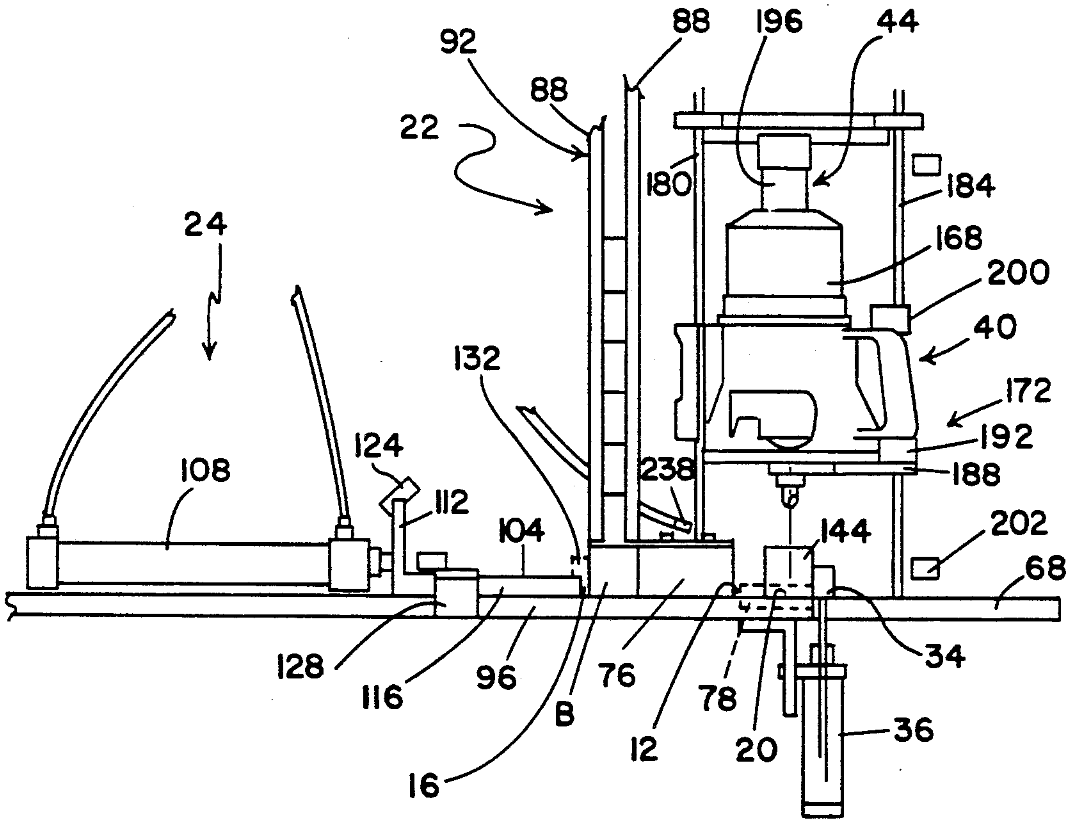
FIG. 1 is a side view of the automatic drilling device of the present invention, partly broken away.
Figure 2:
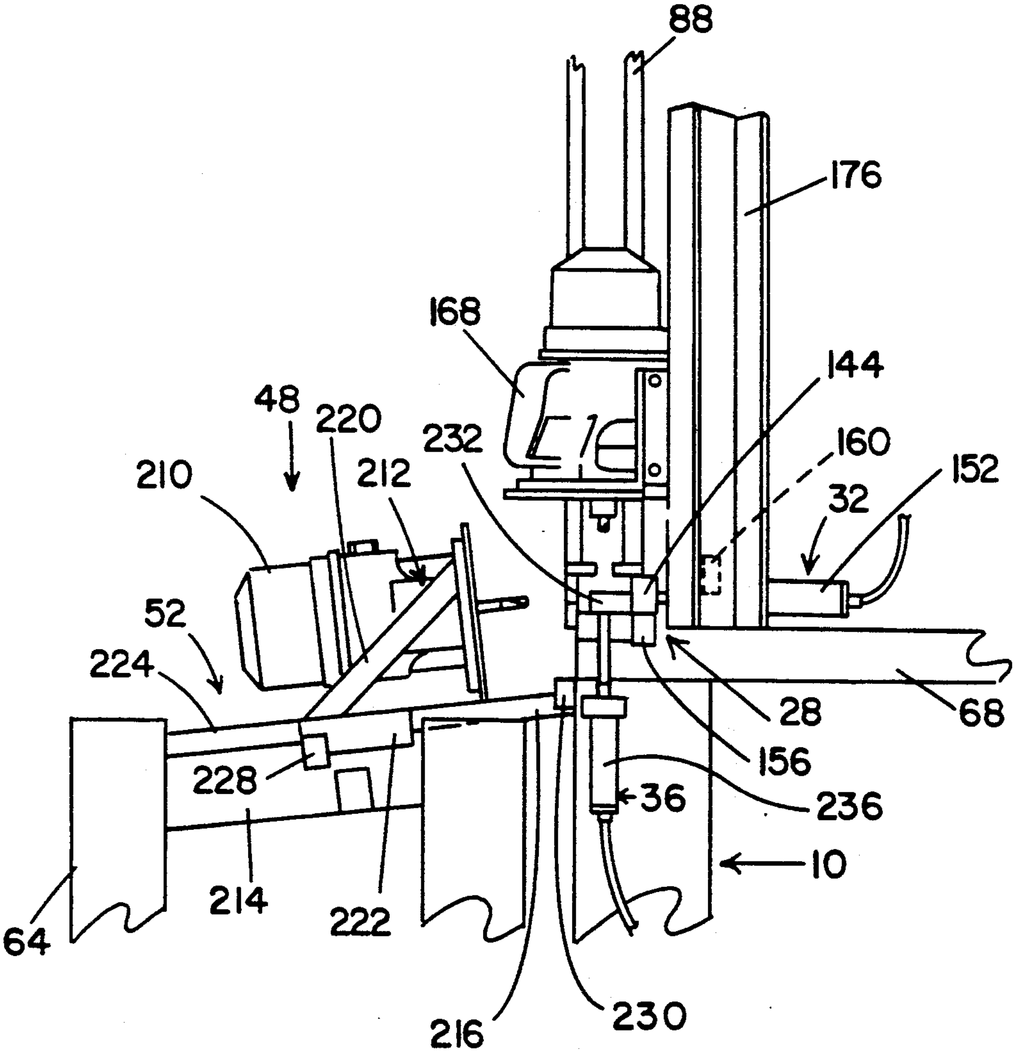
FIG. 2 is an end view of the automatic drilling machine of the present invention, partly broken away.

The automatic drilling machine 8 of the present invention is best shown in FIGS. 1 and 2. The machine 8 is provided for performing a drilling operation, such as routing, on a work piece, such as a wood block B.

A. An Overview of The Primary Components.

The primary components include a frame 10 on which the remaining components of the device 8 are mounted. A track 12 is mounted to the frame and includes a receiving area disposed adjacent the first end 16 of the track, and an operations area disposed adjacent to the second end 20 of the track. A generally vertical chute means 22 is provided for dispensing blocks B onto the receiving end of the track 12. A block advancing means 24 is provided for advancing blocks from the receiving area of the track 12 to the operations area of the track 12, where the drilling operations are performed on the block B.

A selectively actuable side clamp means 28 is disposed adjacent the operations area of the track, and a side clamp moving means 32 is operatively coupled to the side clamp means 28 to move the side clamp means 28 between a block disengaged position wherein the side clamp means 28 is in a spaced relation to the track 12, and a block engaging position wherein the side clamp means 28 is disposed adjacent to the track 12 for engaging a block to be held in a fixed position in the operations area 20 of the track 12.

A selectively actuable end plate means 34 is disposed adjacent to the second end 20 of the track 12. An end plate moving means 36 is provided for moving the end plate means 34 between a block disengaged position below the plane of the track 12, and a block engaged position. In the block engaged position, a block B cannot move longitudinally off the second end 20 of the track 12. When the end plate means 34 is in the block disengaged position, the block B is free to move longitudinally off the second end 20 of the track 12.

A first drill means 40 is disposed adjacent to the operations area 20 of the track for drilling a first bore in the block B. A first drill moving means 44 is provided for moving the first drill means 40 between a block disengaged position wherein the first drill means 40 does not contact the block B, and a block engaging position wherein the first drill means 40 can perform a drilling operation on the block B.

A second drill means 48 is also disposed adjacent to the operations area 20 of the track 12, for drilling a second bore in the block B. A second drill moving means 52 is provided for moving the second drill means 48 between a block disengaged position and a block engaging position. It should be noted that the second drill moving means 52 moves the second drill means 48 along a line generally perpendicular (and preferably between 95 and 115 degrees) from the line in which the first drill moving means 44 moves the first drill means 40.

Figure 3:
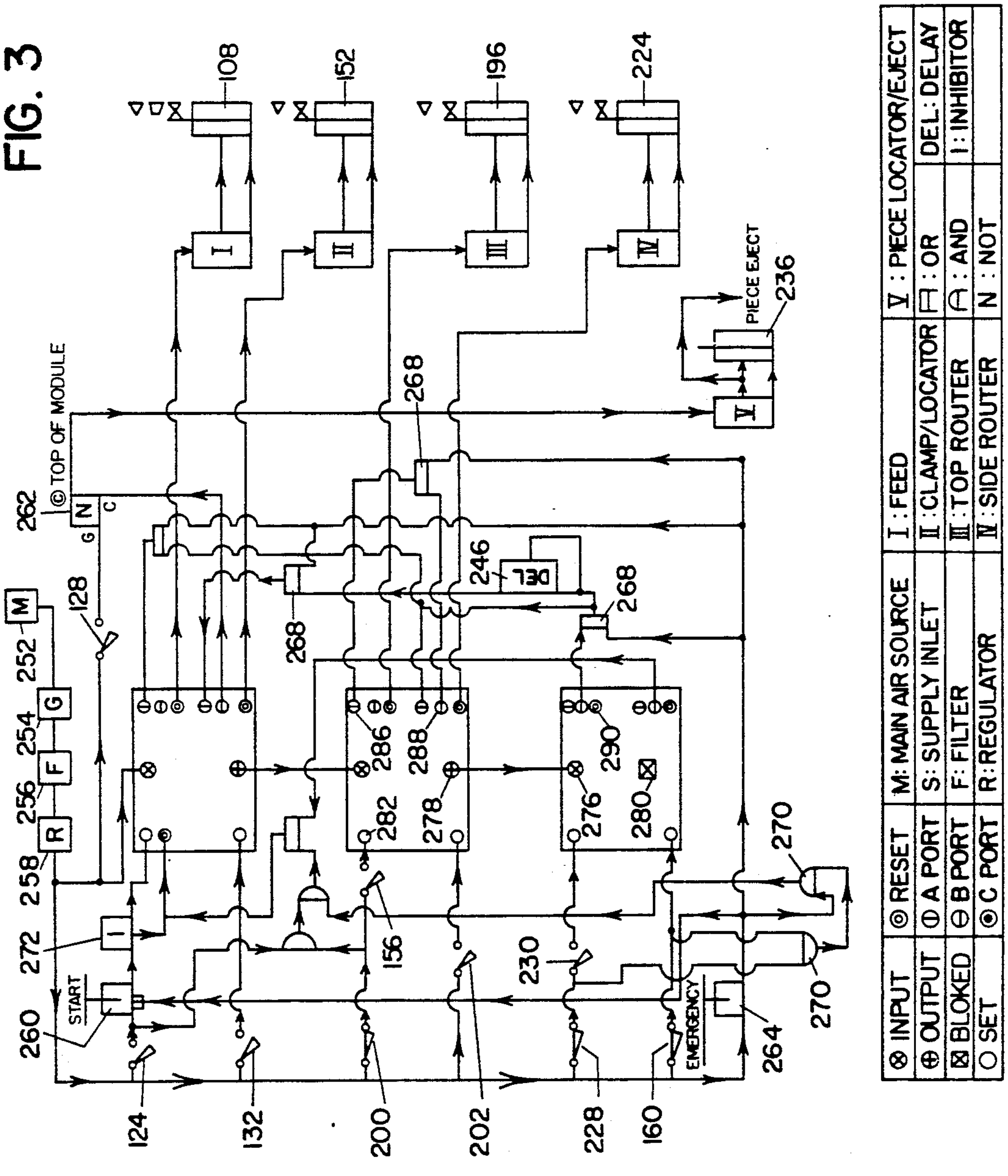
FIG. 3 is a schematic view of a pneumatic logic circuit for use in conjunction with the present invention.

A control means 56 is best show in FIG. 3 as including a pneumatic logic circuit 60 and series of limit valves. The pneumatic logic circuit 60, in conjunction with the limit valves controls the operation of the block advancing means 24, side clamp moving means 32, end plate moving means 36, first drill moving means 44 and second drill moving means 52. As will be explained in more detail below, the limit valves enable this control of the above-mentioned components to take place as a function of the position of the various components such as the block advancing means 24, side clamp means 28, end plate means 34, first drill means 40 and second drill means 48.

B. More Particularized Discussion of The Components.

The frame 10 includes generally vertically extending mounting legs 64 and a generally horizontal disposed plate 68. The legs 64 are provided for maintaining the mounting plate 68 in a spaced relation from the ground or other surface on which the legs 64 rest. The mounting plate 68 is a generally plate-like rectangular member supported by the legs 64, and on which the primary components of the machine 8 are mounted. Most of the primary components are coupled to the upper surface of the mounting plate 68. The mounting plate is preferably a sturdy, rectangular steel plate approximately 10 inches (25.4 cm.) in width, and approximately 26 inches (66.04 cm.) in length. A portion of the upper surface of the mounting plate 26 is used as the track 12. The track 12 comprises a portion of the mounting plate 68 which is generally as wide as a block B. For purposes of this application, the first end of the track 12 is that portion of the track 12 between the proximal end (left side in FIG. 1) of the vertical chute means 22, and the distal end (right side in FIG. 1) of the push rod 104 of block advancing means 24. The receiving area of the track 12 is that portion of the track 12 disposed below the vertical chute 22. The track 12 extends between the vertical chute 22 and the end plate means 34. The operations area of the track 12 is that portion of the track 12 adjacent the second end 20.

Stationary side guards are provided along portions of the track 12 to restrain lateral movement of a block 12 moving longitudinally along the track 12. The stationary side guards include a pair of taller side guards 76 which are disposed in the area of the track 12 between the receiving area and the operations area. In the operations area of the track, a relatively shorter side guard 28 is stationarily mounted adjacent to the side of the track 12 by a mounting bracket. The shorter side guard 78 is designed to extend upwardly from the surface of the track a distance of only about 0.375 inches (0.9525 cm.) This distance is chosen so that the shorter side guard 78 has enough vertical height to restrain lateral movement of a block B in the operations area, but to be sufficiently short so that the drill bit of the second drill means 48 will pass over the top of the shorter side guard 78, without interference by the shorter side guard 78. The shorter side guard 78 works in conjunction with the side clamp means 28, when the side clamp means 28 is in its block engaging position to fix the lateral position of a block B clamped therebetween, to prevent lateral movement of a block B during such time as the first and second drill means 40, 48 are performing their operations on the block B.

The vertical chute means 22 comprises a pair of spaced brackets 88. The spacing between the brackets 88 is chosen so that the cross sectional area of the space between the brackets 88 is generally equal, and similar in dimension to the blocks B. The brackets 88 are spaced to permit a plurality blocks to move, under the influence of gravity in an axial direction from the first end 92 of the vertical chute means 22 to the second end 96 of the vertical chute means 22, but to prevent any significant radial movement of blocks B in the vertical chute 22.

The upper or first end 92 of the vertical chute 22 is the end into which the operator places blocks into the vertical chute 22. The blocks are dispensed from the lower or second end 96. The second and 96 is disposed above the receiving area of the track 12, in a spaced relation thereto. The distance between the second end 96 of the vertical chute 22 and the track 12 is chosen to be great enough to allow a block b dispensed from the second end 96 to pass longitudinally along the track 12 under the second end 96 of the chute, without any interference from the second end 96 of the vertical chute 22. Additionally, the distance between the second end 96 of the vertical chute 22 and the track 12 should be great enough to allow the supine leg 116 of the push rod 104 to pass between the second end 96 and the track 12.

The block advancing means 24 includes a push rod 104 and a push rod moving means such as first pneumatic cylinder 108. The push rod 104 is preferably an L-shaped plate having an upstanding leg 112 and a supine leg 116. The upstanding leg 112 is approximately four inches (10.16 cm.) high, and is connected to the drive rod of the first pneumatic cylinder 108. The supine leg 116 is approximately 8 inches (20.32 cm.) long, 0.75 inches (1.905 cm.) high, and approximately 1.5 inches (3.81 cm.) wide. The upper surface of the supine leg 116 is generally a planar to provide a surface upon which a block B to be dispensed from the second end 96 of the vertical chute 22 can rest when the push rod 104 is in a partially and a fully extended position. The supine leg 116 can be extended to pass between the second end 96 of the vertical chute 22 and the track 12. The pneumatic cylinder 108 is preferably a conventional pneumatic cylinder having a 10 inch (25.4 cm.) stroke, a 3 inch (7.62 cm.) spacer, and a 2 inch (5.08 cm.) bore.

When the push rod 104 is in its fully retracted position, the proximal end (the end with upstanding leg 112) is disposed adjacent to a first limit valve 124, and the distal end is disposed adjacent to the second end 96 with a vertical chute 22. The push rod 104 is sized so that when the push rod is in its fully retracted position, no portion of the push rod 104 extends under the second end 96 of the vertical chute 22, so that a block B to be dispensed from the second end 96 of the vertical chute can fall downwardly onto the track 12.

The first limit valve 124 is mounted adjacent to the first pneumatic cylinder 108, and is actuated by the upstanding leg 112 of the push rod 104.

For the sake of consistency, a limit valve, such as limit valve 124 will be stated to be "actuated" when that limit valve (e.g. limit valve 124) is in contact with the moving component (e.g. upstanding leg 112). Thus limit valve 124 is actuated by the upstanding leg 112 of push rod 104 when the push rod 104 is in its fully retracted position, as shown in FIG. 4. The limit valve will be stated to be "not actuated" (or "deactuated") when the limit valve (e.g. limit valve 124) is not in contact with the moving component (e.g. upstanding leg 112). Thus, as the push rod 104 moves down the track 12 from the receiving area of the track 12 toward the operations area, the limit valve 124 would become "deactuated." Conversely, as the push rod 104 retracts away from the operations area toward the receiving area of the track, so that the push rod 104 is in its fully retracted position, and the upstanding leg 112 contacts limit valve 124, the limit valve 124 would be considered to be "actuated."

A second limit valve 128 and a third limit valve 132 are also associated with the push rod 104. Second limit valve 128 is actuated by the supine leg 116 of the push rod 104. The second limit valve 128 is positioned so that the second limit valve 128 becomes "deactuated" when the push rod !04 is partially extended. Unlike the first limit valve 124, the second limit valve 128 does not become deactuated immediately upon movement of the first push rod 104 away from its fully retracted position. Rather, the second limit valve 128 becomes deactuated after the push rod 104 has extended to a point wherein the distal end of the push rod 104 is almost completely under the second end 96 of the vertical chute. During retraction of the push rod 104 from the operations area of the track 12 toward the receiving area of the track 12, the push rod 104 travels across the second limit valve 128 before such time as the push rod 104 is in its fully retracted position. Any contact between the push rod 104 and the second limit valve 128 causes nothing to happen with any of other moving components of the machine 8. This contrasts with the first limit valve 124 which only becomes actuated when the push rod 104 is in its fully retracted position. The third limit valve 132 is disposed adjacent to the vertical chute 22, and is designed to be actuated when the push rod 104 is in its fully extended position, that is, when the distal end of the push rod 104 has moved a block B into the operations area of the track 12.

The first, second and third limit valves 124, 128, and 132 respectively are operatively coupled through the pneumatic logic circuit 60 to cause the following events to occur upon actuation of the respective first, second and third limit valves 124, 128 and 132.

The first limit valve 124 is operatively coupled through the pneumatic logic circuit 60, so that when the first limit valve 124 is actuated, the pneumatic logic circuit 60 signals the first pneumatic cylinder 108 to cease the retracting movement of its drive rod. Additionally, actuation of the first limit valve 124 can cause the drive rod to extend the push rod 104 toward the operations area, or ultimately cause the system to go to a "rest" mode if no further cycles are to be undertaken by the machine 8.

The second limit valve 128 is operatively coupled by the control to the end plate moving means 36 to cause movement of the end plate 34. The third limit valve 132 is operatively coupled to the side clamp moving means 32 to cause the side clamp moving means 32 to move from a block disengaged position to a block engaging position upon actuation of the third limit valve 132.

The side clamp means 28 includes a generally plate-like side clamp 144 having a generally planar face for engaging the block B. The side clamp plate 144 is approximately two inches (5.08 cm.) in height, 2.125 inches (5.3975 cm.) in width, and approximately 0.9375 inches (2.38 cm.) in thickness. The rear surface of the side clamp plate 144 is mounted to the drive rod of a second pneumatic cylinder 152, which comprises the side clamp moving means 32. The second pneumatic cylinder 152 preferably has a 1.5 inch (3.81 cm.) bore, and a 2.5 inch (6.35 cm.) stroke. A fifth limit valve 156 and a ninth limit valve 160 are mounted to the mounting plate 68 along the path of travel of the side clamp plate 144 to be actuated when the side clamp plate 144 is in its fully extended block engaging position, (fifth limit valve 156) and in its fully retracted, block disengaged position (ninth limit valve 160). As is best shown in FIG. 2, the second pneumatic cylinder 152 moves side clamp plate 144 along a line which is generally perpendicular to (a) the line in which the push rod 104 is moved, (b) the line in which the end plate means 34 is moved, and (c) the line in which the first drill means 40 is moved.

The fifth limit valve 156 is operatively coupled through the pneumatic logic circuit 60, to the first drill moving means 44 to cause the first drill moving means 44 to begin extending the first drill means 40 into its block engaging position upon actuation of the fifth limit valve 156. Additionally, the fifth limit valve 156 is operatively coupled through the pneumatic logic circuit 56 to the second pneumatic cylinder 152, to signal the second pneumatic cylinder 152 that the side clamp plate 144 is in its fully extended, block engaged position, and that any further movement of the side clamp plate 144 should be in a retracting direction toward the side clamp plate's 144 block disengaged position.

The ninth limit valve 160 is operatively coupled to the second pneumatic cylinder 152 to signal the second pneumatic cylinder 152 that the side clamp plate 144 is in its fully retracted, block disengaged position, and that any further movement of the side clamp plate 144 by the second pneumatic cylinder 152 should be in a direction toward the fifth limit valve 156. That is, further movement should be in a direction toward the block engaging position of the second clamp plate 144.

The first drill means 40 includes a first drill 168. Preferably, the first drill 168 comprises a Porter Cable, Model 520, 0.75 horsepower router, although the first drill 168 could comprise a conventional non-router type drill.

The bit used with the router can be a conventional router bit of the desired size. The applicant has found that particularly favorable results are obtained by the use of a specially designed combination chamfer/router bit. The combination bit is used to route the vertical tunnel portion and chamfer the area of the vertical tunnel adjacent to the surface of the block B. The first drill means 40 also includes a first drill mounting fixture 172 that includes both stationary and moving components. The stationary components of the first drill mounting fixture 172 include a pair of generally vertically extending parallel I-beam shaped supports 176. A first cylindrical shaft 180 is fixedly mounted to one of the pair of I-beam shaped supports 176, and a second cylindrical shaft 24 is fixedly mounted to the other of the pair of I-beam shaped supports 176. The first and second cylindrical shafts 180, 184 are preferably cylindrical in cross-section and about 0.75 inches (1.905 cm.) in diameter. The first and second cylindrical shafts 180, 184 are maintained in a spaced, parallel relation to provide a track along which the movable components of the first drill mounting fixture 172 can move.

The movable components of the first drill mounting fixture 172 include a movable drill platform 188 that includes a generally horizontal member upon which the drill can be mounted, and a pair of sleeves, 192. Preferably, the sleeves 192 each comprise a linear motion bearing. The sleeves 192 each include a cylindrical bore sized to receive the cylindrical shafts 180, 184 respectively. The cylindrical shafts 180, 184 comprise a track upon which the sleeves 192 and hence the movable drill platform 188 can travel between the block engaging position of the first drill 168, and the block disengaged position of the first drill 168.

The first drill moving means 44 comprises a third pneumatic cylinder 196. The third pneumatic cylinder 196 preferably has a three inch (7.62 cm.) stroke, and a two inch (5.08 cm.) bore.

A fourth limit valve 200 and a sixth limit valve 202 are associated with the first drill means 40. Preferably, the fourth limit valve 200 is mounted to one of the I-beam supports 176 and is positioned to be actuated by the movable drill platform 188 when the first drill 168 is in its fully retracted position. The sixth limit valve 202 is also preferably mounted to one of the pair of I-beam supports 176, and is positioned to be actuated by the movable drill platform 188, when the movable drill platform 188 is in its fully extended, block engaging position.

The fourth limit valve 200 is operatively coupled, through the pneumatic logic circuit 60 to the third pneumatic cylinder 196 to signal the third pneumatic cylinder 196 that upon actuation of the fourth limit valve 200, the top drill has reached its furthest retracted position, and that any further movement of the movable drill platform 188 is to be in an extending direction toward its block engaging position. Additionally, the fourth limit valve 200 is operatively coupled through the pneumatic logic circuit 60 to the second drill moving means 52, to cause the second drill moving means 52 to move the second drill means 48 in an extending direction towards its block engaging position, in response to actuation of the fourth limit valve 200.

The sixth limit valve 202 is operatively coupled, through the pneumatic logic circuit 60 to the third pneumatic cylinder 196, to cause the third pneumatic cylinder 196 to begin retracting the movable drill platform 188 toward its block disengaged position upon actuation of the sixth limit valve 202.

The second drill means 48 and a second drill moving means 52 are constructed generally similarly to the first drill means 40 and first drill moving means 44. The second drill means 48 includes second drill 210 and a second drill mounting fixture 212. The second drill mounting fixture 212 includes a pair of generally horizontally disposed I-beam shaped supports 214. A first cylindrical shaft 216 is mounted to one of the I-beam shaped supports 214 and a second cylindrical shaft 218 is mounted to the other of the pair of eye-beam shaped supports 214. The first and second cylindrical shafts 216, 218 are preferably not perfectly horizontal. Rather, the first and second cylindrical shafts 216, 218 are disposed between about 95 and 115 degrees from the first and second cylindrical shafts 180, 184 of the first drill mounting fixture 172, so that the path followed by the second drill 210 is along a line approximately 95 to 115 degrees from the line in which the first drill 168 moves.

The movable portion of the second drill mounting fixture 212 also includes a movable drill platform 220 having a pair of sleeves 222 mounted thereto. One of the sleeves 222 slidably receives first cylindrical shaft 216 and the other sleeve 222 slidably receives second cylindrical shaft 218. The second drill moving means 52 comprises a fourth pneumatic cylinder 224 which preferably has a two inch (5.08 cm.) bore and a three inch (7.62 cm.) stroke. A seventh limit valve 228 and an eighth limit valve 230 are associated with the second drill means 48, for actuation by a movable portion of the second drill mounting fixture 212, such as either the movable drill platform 220 or one of the sleeves 222.

The seventh limit valve 228 is positioned to be actuated when the second drill 210 is in its fully retracted, block disengaged position. The eight limit valve 230 is preferably mounted to the mounting plate 68 to be actuated by the second drill means 48 when the second drill 210 is in its fully extended, block engaging position.

The seventh limit valve 228 is operatively coupled, through the pneumatic logic circuit 60 to the first pneumatic cylinder 108, to prohibit movement of the first pneumatic cylinder 108, unless the seventh limit valve 228 is actuated. Additionally, the seventh limit valve 228 is operatively coupled to the first pneumatic cylinder 108 to cause the first pneumatic cylinder 108 to begin extending the push rod 104 toward the operations area of the track 12 upon actuation of the seventh limit valve 228 by the second drill means 48.

Additionally, the seventh limit valve 228 is operatively coupled, through the pneumatic logic circuit 56, to the second pneumatic cylinder 152 of the side clamp moving means 32, to cause the side clamp moving means 32 to retract the side clamp means 28 from its block engaging position into its block disengaged position upon actuation of seventh limit valve 28.

The eighth limit valve 230 is operatively coupled to the first pneumatic cylinder 108 (push rod moving means) to cause the first pneumatic cylinder to begin retracting the push rod 104 upon actuation of the eighth limit valve 230. That is, the retraction of the second drill means 48 and push rod 104 begin simultaneously upon actuation of the eighth limit valve 230.

The eighth limit valve 230 is also operatively coupled to the second drill moving means 52 (fourth pneumatic cylinder 224) to cause the fourth pneumatic cylinder 224 to begin retracting the second drill 210 toward its block disengaged position upon actuation of the eighth limit valve 230.

The end plate means 34 includes a plate-like end plate 232 which is preferably about 1.5 inches (3.81 cm.) wide approximately 0.875 inches (2.222 cm.) high and approximately 0.625 inches (1.587 cm.) in width. The end plate 232 includes an internal threaded aperture for threadedly engaging the drive rod of a fifth pneumatic cylinder 236. Fifth pneumatic cylinder 236 is a component of the end of plate moving means 36.

The end plate 232 and fifth pneumatic cylinder 236 operate somewhat differently than the other moving components of the machine 8. The end plate 232 and the fifth pneumatic cylinder 236 are operatively controlled by the pneumatic logic circuit 60 to normally be in the block engaged position during operation of the machine 8. When the end plate 232 moves out of its block engaging position and into its block disengaged position, the movement occurs rather quickly, so that the end plate is only out of its block disengaged position for a few seconds.

The fifth pneumatic cylinder 236 is operatively coupled, through the pneumatic logic circuit 60 to the second limit valve 128. When the second limit valve 128 is actuated, the actuation of the second limit valve causes the fifth pneumatic cylinder 236 to retract the end plate 232 quickly, and then to quickly reextend the end plate 232 into its block engaging position. During such time as the end plate 232 is not in its block engaging position, the air emanating from the air blow off valve 238 can push the block B off of the second end 20 of the track 12. The air blow off valve 238 comprises an air nozzle from which air is constantly expelled when the end plate 232 is out of its fully extended, block engaging position of the operation of the machine 8.

Another difference in the operation of fifth pneumatic cylinder 236 and end plate 232, is that the second limit valve 128 is actuated and deactuated very quickly. The second limit valve 128 is preferably a roller type limit valve which is actuated by the push rod 104 passing over it, and then deactuated as the push rod 104 continues its extending travel. The actuation/deactuation cycle of the second limit valve should be about 0.3 milliseconds.

Turning now to FIG. 3, it will be noticed also that a delay component 246 is interposed in the pneumatic logic circuit 60 between eighth limit valve 230 and second pneumatic cylinder 152. Thus, actuation of the eighth limit valve 230 caused by the contact between eighth limit valve 320 and the second drill 210 causes air to flow between the eighth limit valve 230, through the delay component 246 and to the second pneumatic cylinder 152. This delays the movement of the second pneumatic cylinder 152, and hence side clamp 144 by a time equal to the amount of delay induced by the delay component 246.

C. Control Means

Turning now to FIG. 3, a schematic view of the control means 24, including the pneumatic logic circuit 60 and associated components of the present invention is shown.

The pneumatic logic circuit 60 FIG. 3 shows the first through ninth limit valves 124, 128, 132, 200, 156, 202, 228, 230, and 160, and the first through fifth pneumatic cylinders, 108, 152, 196, 224 and 236. The pneumatic logic circuit 60 includes a series of air passageways and air logic components to operatively couple the various limit valves to their appropriate pneumatic cylinders.

The primary components of the pneumatic logic circuit 60 are a main air supply 252, a supply inlet 254, a filter 256, a regulator 258, a start switch 260, and an emergency cutout switch 264.

Other components within the circuit include the delay component 246, and a NOT component 262. The NOT component 262 is operatively coupled to the fifth pneumatic cylinder 23 that controls the end plate 232. The NOT component is operatively coupled between the second limit valve 128 and the fifth pneumatic cylinder 236, to cause the end plate 232 to not retract during the part of the cycle when the push rod 104 is retracting, and passes across second limit valve 128. Thus, through the NOT component 262, the only time that the second limit valve actuates the end plate 232 to move in during the time that the push rod 104 is advancing a block B toward the operations area of the track 12.

Other components of the pneumatic circuit include OR junctions such as OR junction 268, and junctions such as junction 270, and inhibitors such as inhibitor 272.

As will be appreciated by those familiar with pneumatic logic circuits, the circuit 60 also includes a plurality of input ports 276, output ports 278, blocked ports 280, set ports 282, reset ports 284, A ports 286, B ports 288, and C ports 290.

The operation of such input ports, output ports and like will be generally understood from the schematic drawing by those familiar with pneumatic logic circuits.

The operation of the pneumatic logic circuit 60 is best described in connection with the various limit valves and their interaction through the pneumatic logic circuit with the pneumatic cylinders 108, 152, 196, 224, 236.

The first limit valve 124 is operatively coupled, through the control means 26 to the first pneumatic cylinder 108, to cause air to flow into the first pneumatic cylinder 108 in a direction which will cause the drive rod of the first pneumatic cylinder 108 to extend the push rod 104 from its fully retracted position toward its fully extended position. When the machine 8 is turned off, actuation of the first limit valve 124 also signals to the machine 8 that a cycle is over, and that no further movement of the remaining movable components of the machine 8 is to occur.

The second limit valve 128 is operatively coupled through the pneumatic logic circuit 60 to the fifth pneumatic cylinder 236. It should be noted that the second limit valve 128 is coupled to the fifth pneumatic cylinder 236 through the NOT circuit 262. By coupling the second limit valve 128 through the NOT 262, the end plate 232 is moved from its block engaging position into a block disengaged position, and then back quickly to the block engaging position only during the time that the push rod 104 is traveling toward the operations area of the track 12. When the push rod 104 is retracting back toward the receiving area of the track 12, the second limit valve 128 is not actuated.

The third limit valve 132 is actuated when the push rod 104 has reached its fully extended position. The third limit valve is operatively coupled through the pneumatic logic circuit 60 to the side clamp moving means, second pneumatic cylinder 152. When the third limit valve 132 is actuated, the second pneumatic circuit 152 causes the side clamp 144 to fully extend into its block engaged position.

The third limit valve 132 is also operatively coupled to the first pneumatic cylinder 108, so that upon actuation of the third limit valve 132, further movement of the push rod 108 is in a retracting direction.

The fourth limit valve 200 is operatively coupled to the top drill moving means, third pneumatic cylinder 196, so that upon actuation of the fourth limit valve 200, the movement of the first drill means 40 is stopped. The fourth limit valve 200 is also operatively coupled to the fourth pneumatic cylinder 224, so that upon actuation of the fourth limit valve 200, the fourth pneumatic cylinder 224 begins extending the second drill means 48 into its block engaging position.

The fifth limit valve 156 is operatively coupled through the pneumatic circuit 60 to both the second pneumatic cylinder 152 and the third pneumatic cylinder 196. Upon actuation of the fifth limit valve 156, the extending movement of the second pneumatic cylinder 152 ceases. Simultaneously, the third pneumatic cylinder 196 begins extending the first drill means 40 into its block engaging position.

The sixth limit valve 202 is operatively coupled through the pneumatic circuit 60 to the first drill moving means, third pneumatic cylinder 196. Upon actuation of the sixth limit valve 202, the third pneumatic cylinder 196 begins retracting the first drill means 40 from its fully extended, block engaging position, towards its fully retracted, block disengaged position.

The seventh limit valve 228 is operatively coupled to the push rod moving means, first pneumatic cylinder 108, and the second drill moving means, fourth pneumatic cylinder 224.

The seventh limit valve 228 is coupled to the first pneumatic cylinder 108, to prevent the first pneumatic cylinder from extending the push rod 104 toward the operations position of the track 12 unless the seventh limit valve 228 is actuated.

The seventh limit valve is coupled to the fourth pneumatic cylinder 224, so that upon actuation of the seventh limit valve, the fourth pneumatic cylinder 224 will cease movement of the second drill means 48, and any later movement will be directed to extend the second drill means 48 toward its block engaging position.

The eighth limit valve is coupled, through delay component 246 to the second pneumatic cylinder 152, to cause the second pneumatic cylinder 152 to begin retracting the side clamp 144, after a predetermined delay, from its block engaging position to its block disengaged position upon actuation of the eighth limit valve 228.

The eighth limit valves 230 also is operatively coupled through the pneumatic circuit 60 to the first pneumatic cylinder 108 and the fourth pneumatic cylinder 24. Upon actuation of the eighth limit valve 230, the first pneumatic cylinder 108 begins to retract the push rod 104 from its fully extended position adjacent to the operations area of the track 12, to its fully retracted position adjacent to the receiving area of the track 12.

Additionally, upon actuation of the eighth limit valve 230, the fourth pneumatic cylinder 224 is caused to cease any further extension movement of the second drill means 48, and to begin retracting the second drill means 48 toward its block disengaged position.

The ninth limit valve means 160 is operatively coupled to the side clamp moving means (second pneumatic cylinder 152) to cause the second pneumatic cylinder 152 to cease movement of the side clamp 144 when the ninth limit valve 160 is actuated by the side clamp 144.

Figure 4A:
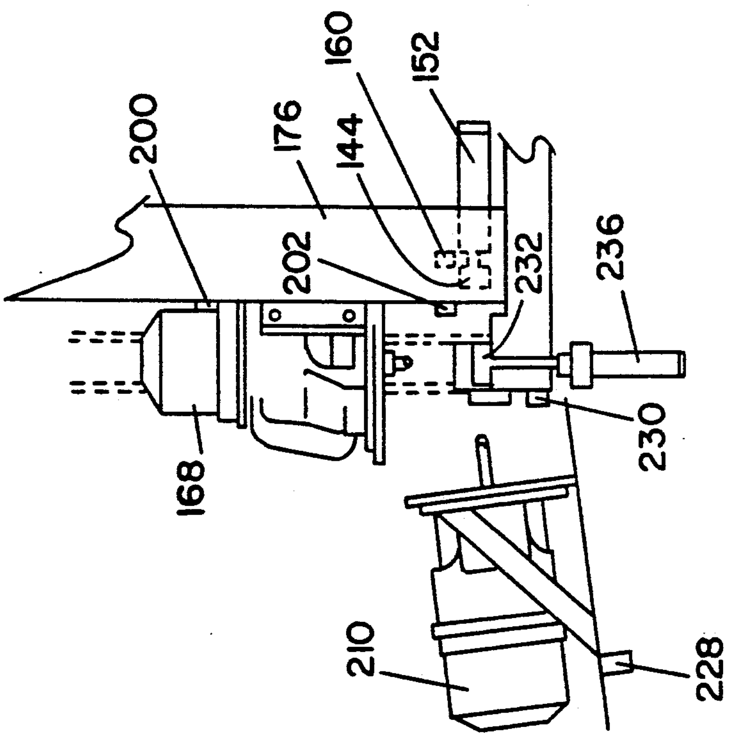
FIG. 4*a* is a highly schematic end view of the present invention in the first stage of its cycle.
Figure 4:
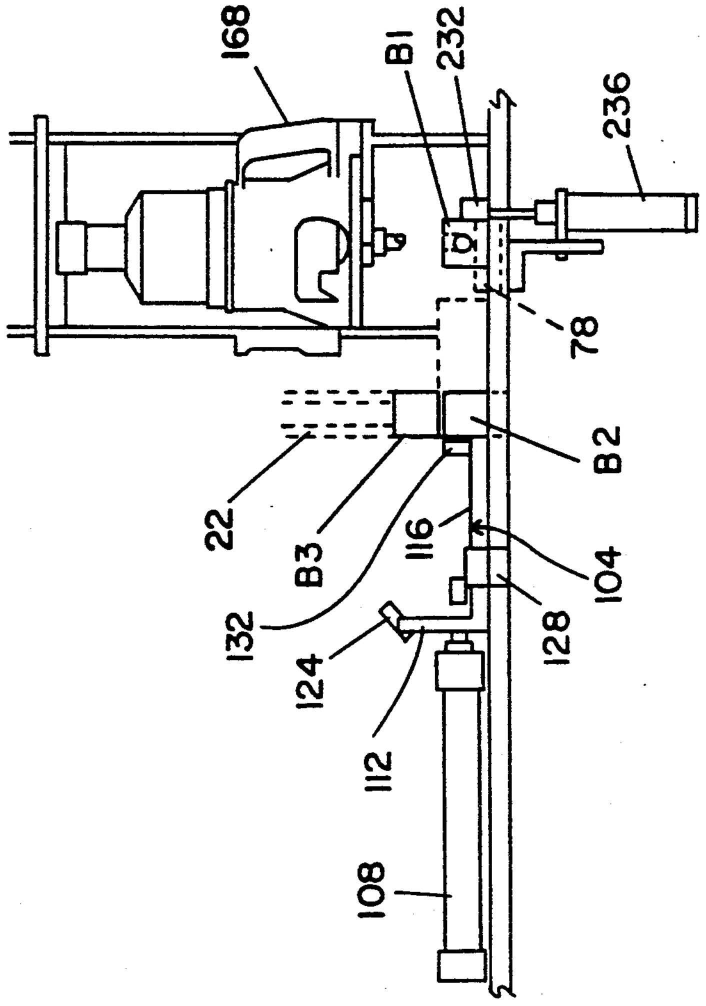
FIG. 4 is a side, highly schematic view of the present invention in a first stage of its cycle.

If the emergency switch 264 is tripped, all of the components will retract to the position shown and described in conjunction with FIGS. 4 and 4*a*. Additionally, the emergency switch 264 is operatively coupled to the start switch 260, to prevent actuation of the start switch 260 until the emergency switch is released.

D. Operation of the Machine.

The operation of the machine is best understood with reference to FIGS. 4–7*a* which represent a sequential view of the device during a cycle.

Turning now to FIGS. 4 and 4*a*, the device 8 is shown in its rest position, at the beginning of a cycle.

When in its rest position, it will be noted that the push rod 104, side clamp means 28, first drill means 40 and second drill means 48 are all in their retracted, block disengaging position. End plate means 34, however, is in its fully extended block disengaging position. When the cycle is started, push rod 104 begins its movement toward the receiving area of the track 12 as best shown in FIGS. 5 and 5*a*.

Figure 5A:
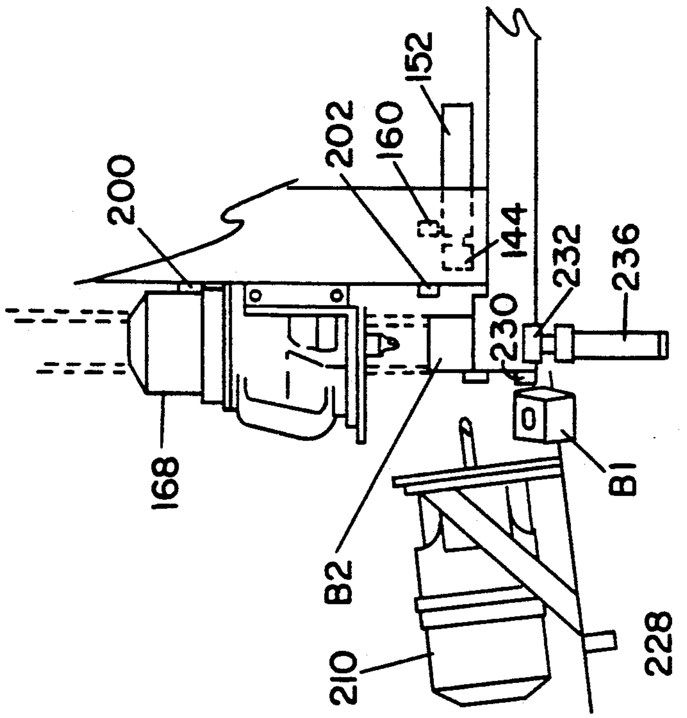
FIG. 5*a* is a highly schematic end view of the present invention in a second stage of its cycle.
Figure 5:
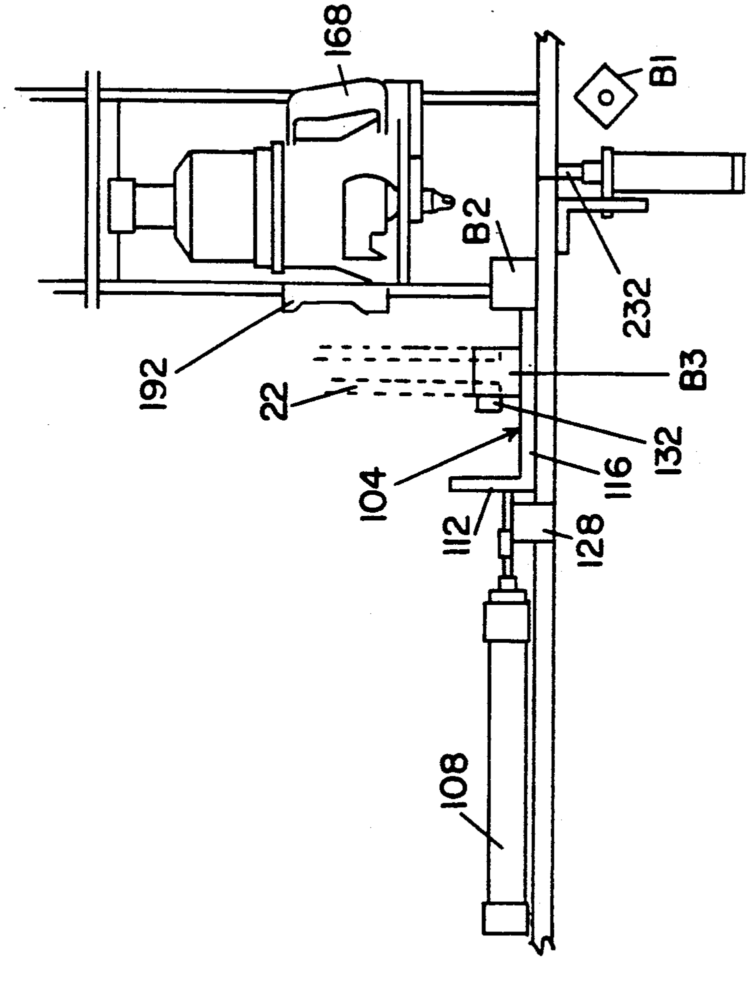
FIG. 5 is a highly schematic side view of the present invention in a second stage of its cycle.

In FIG. 5*a*, it will be noticed that the second limit valve 128 has been actuated. That is, the push rod 104 has extended to a point wherein the second limit valve 128 is no longer in contact with the push rod 104. Upon the tripping of the second limit valve 128, it will be noted that the end plate means 134 has retracted into its block disengaged position, and that the air blow off valve 238 has blown the block B1 that was formerly in the operations area off the second end 20 of the track 12. It should also be noted that Block B2 which was formerly (in FIGS. 4 and 4*a*) on the receiving area of the track 12 has been pushed by the distal end of the push rod 104 toward the operations area of the track. Further, the Block B3, which is the next block in the vertical chute 22 to be dispensed, rests on the upper planar surface of the supine leg 116 of the push rod 104.

At this point in the cycle, the side clamp means 28, first drill means 40, and second drill means 48 still remain in their fully retracted, block disengaged positions.

Figure 6A:
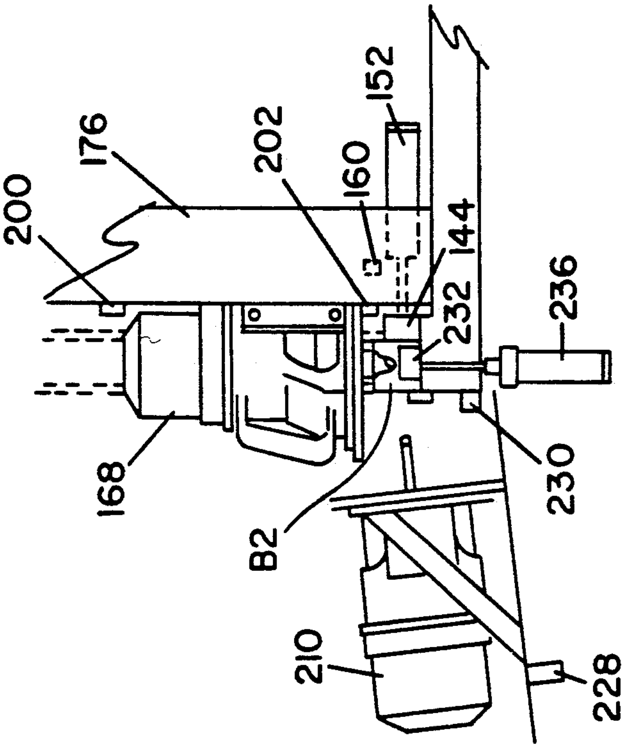
FIG. 6*a* is a highly schematic end view of the present invention in the third stage of its cycle.
Figure 6:
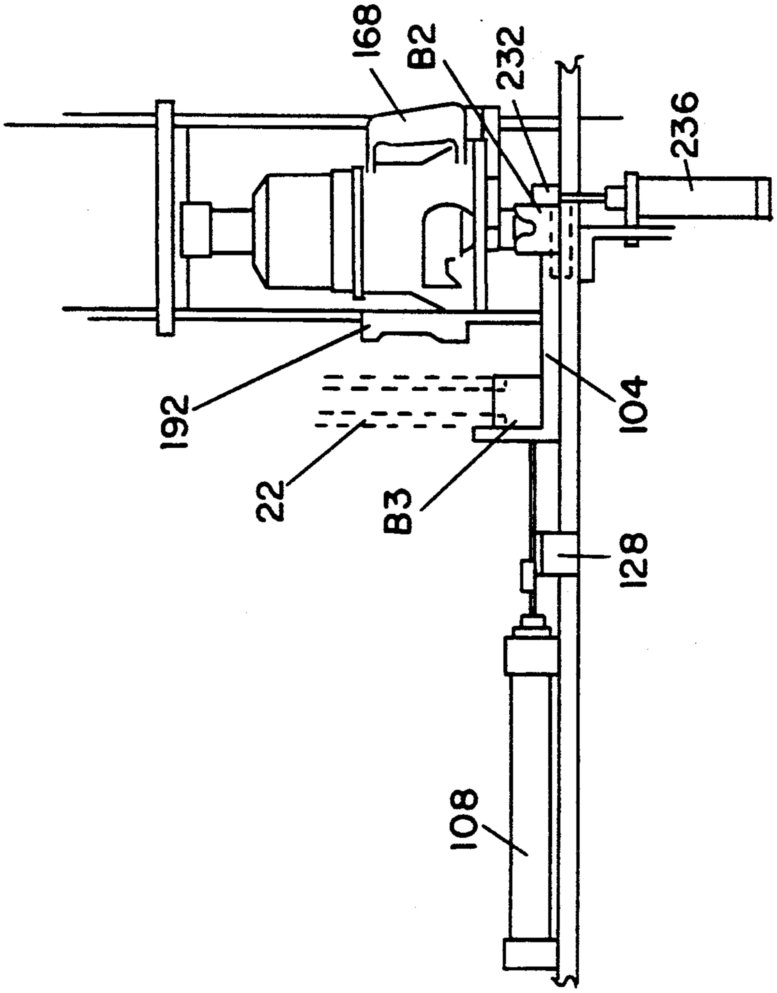
FIG. 6 is a highly schematic side view of the present invention in a third stage of its cycle.

Turning now to FIGS. 6 and 6*a*, it will be noted that the push rod 104 has pushed the block B2 into the operations area of the track. At this point in the cycle, the push rod 104 is at its fully extended position, wherein the distal end of the push rod 104 is adjacent to the operations area of the track 12. The actuation of third limit valve 132 has caused the side clamp means 28 to be moved by the side clamp moving means 32 to its fully extended, block engaging position. The actuation of the fifth limit valve 156 by side clamp means 28 has caused the first drill means 40 to move into its fully extended, block engaging position to drill the vertical portion of the elbow-shaped tunnel into block B2. The second drill means 48, however, remains at this point in the cycle in its fully retracted position.

From the position in the cycle shown in FIG. 2, the first drill means 40 actuates the sixth limit valve 202, causing the first drill means 40 to change direction, and begin retracting into its block disengaged position. The first drill 40 retracts until it has actuated the fourth limit valve 200. When fourth limit valve 200 is actuated, the second drill 48 begins extending forwardly from its block disengaged position into its block engaging position, as shown in FIGS. 7 and 7*a*.

Figure 7A:
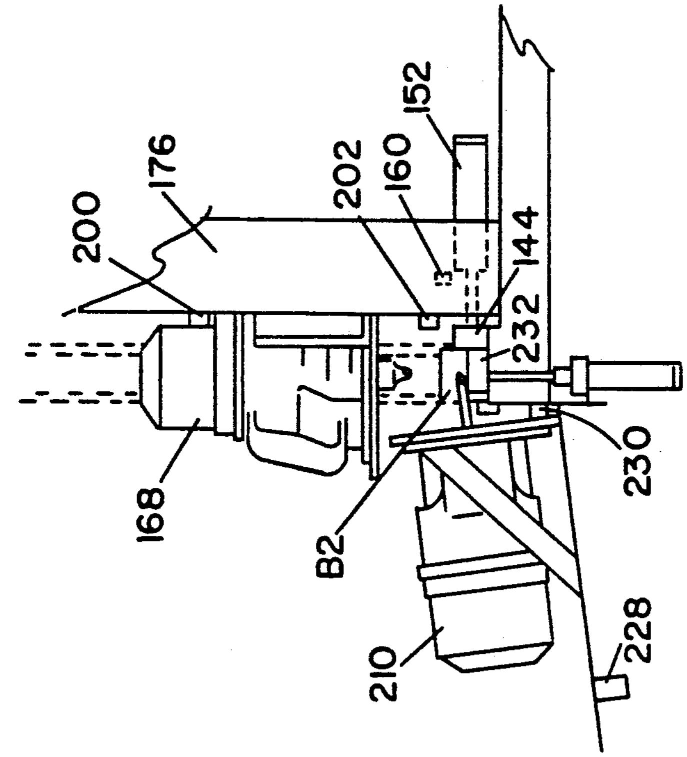
FIG. 7*a* is a highly schematic end view of the present invention in the fourth stage of its cycle.
Figure 7:
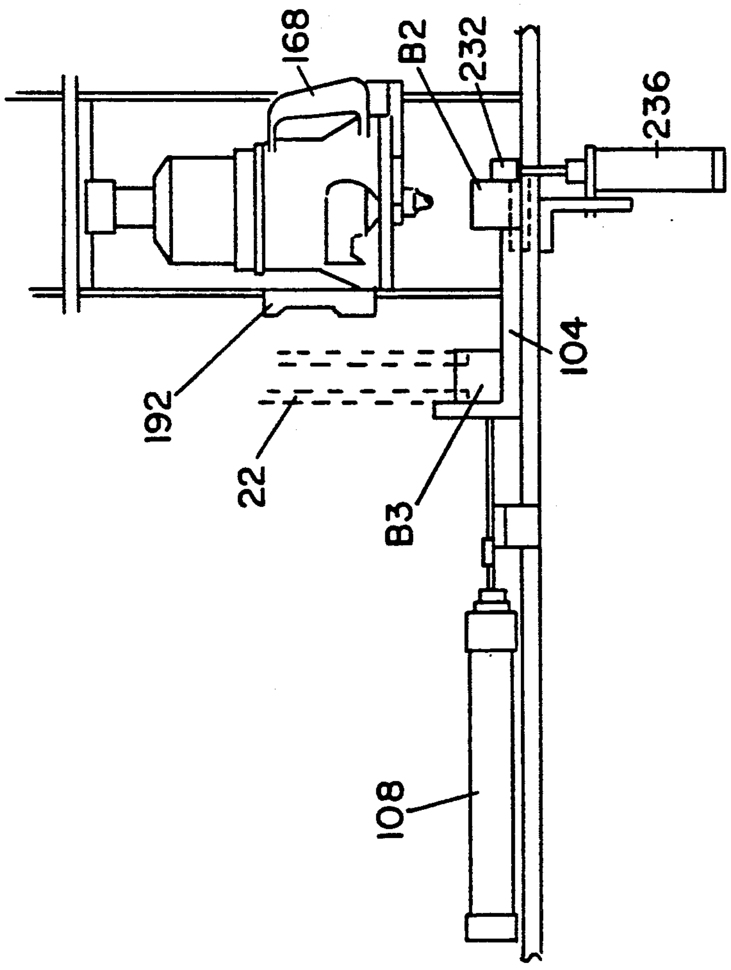
FIG. 7 is a highly schematic side view of the present invention in the fourth stage of its cycle.

In FIGS. 7 and 7*a*, it will be noticed that the second drill means 48 is drilling the generally horizontal portion of the elbow-shaped bore through block B-2. It should also be noted that the block B3 to be dispensed in the vertical chute 22 still remains resting on the upper surface 116 of the push rod 104. At this point in the cycle, the push rod 104 is fully extended so that its distal end is adjacent to the operations area of the track 12. The side clamp 28 remains fully extended in its block engaging position, along with the end plate 34. The first drill means 40 has been retracted and is resting in its fully retracted, block disengaged position.

The next point in the cycle is that the second drill 48 will actuate the eighth limit valve 230. This actuation of the eighth limit valve will cause the second drill means 48 to begin retracting out of its block engaging position, and into its block disengaged position. Actuation of the eighth limit valve will also cause the second pneumatic cylinder 152 to begin retracting the side clamp 144. Simultaneously, the push rod 104 will begin retracting until the push rod 104 reaches a point wherein it actuates the first limit valve 124.

When the second drill means 48 has retracted to a point wherein it actuates the seventh limit valve 228. When the second drill means 48 has actuated the seventh limit valve 228, and the push rod 104 has actuated the first limit valve 124, the cycle is complete, and a new cycle is ready to begin. At that point, the components of the machine 8 will be in their positions shown in FIGS. 4 and 4*a*.

Although the device has been described with reference to certain preferred embodiments, variations and modifications exist within the spirit and scope of the claims presented herewith.

What is claimed is:

1. An automatic drilling apparatus for performing a drilling operation on a block, the apparatus comprising (1) a track on which on which the block can travel, the track including a receiving area adjacent to the first end of the track, and an operations area adjacent to the second end of the track (2) a generally vertical chute means having a first end for receiving a block to be dispensed, and a second end disposed adjacent to the receiving area of the track for dispensing blocks on to the second end of the track, (3) a block advancing means for advancing the block from the receiving area of the track to the operations area of the track, (4) a selectively actuable side clamp means disposed adjacent to the operations area of the track, (5) side clamp moving means for moving the side clamp between a block disengaged and a block engaging position, (6) a selectively actuable end plate means disposed adjacent the second end of track, (7) an end plate moving means for moving the end plate between a block disengaged position and a block engaging position to permit ejection of the block from the track, (8) a first drill means disposed adjacent to the operations area of the track, (9) a first drill moving means for moving the first drill means between a block disengaged position and a block engaging position,

(10) a second drill means disposed adjacent to the operations area of the track,

(11) a second drill moving means for moving the second drill between a block disengaged position and a block engaging position, and

(12) a control means for controlling the operation of the block advancing means, side clamp moving means, end plate moving means, first drill moving means and second drill moving means.

2. The invention of claim 1 wherein the block advancing means includes a selectively actuable push rod means and a push rod moving means for moving the push rod, along the track, the push rod including (1) an upstanding leg disposed generally perpendicular to the track, the upstanding leg being coupled to the push rod moving means, and (2) a supine leg disposed generally parallel to the track, the supine leg being sized and positioned to be pass between the second end of the chute means and the track.

3. The invention of claim 2 wherein the control means includes a first, a second, and a third limit valve means actuable by the push rod means, the first limit valve means being actuable by the push rod when the push rod is in a fully retracted position, the second limit valve means being actuable by the push rod when the push rod is in a partially extended position, and the third limit valve means being actuable by the push rod when the push rod is in a fully extended position.

4. The invention of claim 3 wherein the control means includes (1) means for operatively coupling the second limit valve means to the end plate moving means to cause the end plate moving means to move in response to actuation of the second limit valve means, and (2) means for operatively coupling the third limit valve means to the side clamp moving means to cause the side clamp moving means to move the side clamp into its block engaging position in response to actuation of the third limit valve means.

5. The invention of claim 1 wherein the first drill means includes:

(1) a first drill, and (2) a first drill mounting fixture including (a) a first drill stationary portion having a first drill bracket mounted to the frame, and a shaft means mounted to the first drill bracket, and (b) a first drill movable portion having a first drill platform to which the first drill is mounted, and means for slidably receiving the shaft means of the first drill stationary portion.

6. The invention of claim 5 wherein the control means includes a fourth limit valve means actuable by the first drill platform when the first drill is in a fully retracted block disengaged position, and a sixth limit valve means actuable by the first drill platform when the first drill is in a fully extended, block engaging position.

7. The invention of claim 1 wherein the side clamp means comprises a plate movable by the side clamp moving means along a line generally perpendicular to (1) a line in which the block advancing means moves the block, (2) a line in which the end plate moving means moves the end plate means, (3) and a line in which the first drill moving means moves the first drill.

8. The invention of claim 7 wherein the control means includes a fifth limit valve means actuable by the side clamp means when the side clamp means is in a fully extended block engaging position, and a ninth limit valve means actuable by the side clamp means when the side clamp means is in a fully retracted, block disengaged position.

9. The invention of claim 1 further comprising a stationary side guard member disposed at a side of the track adjacent to the receiving area of the track for preventing lateral movement of a block on the receiving area of the track, wherein, when the side clamp means is in the block engaging position, the side clamp means exerts a force against a block to securely clamp the block between the side clamp means and the side guard member to prevent lateral movement of the block.

10. The invention of claim 1 wherein the control means includes a fourth limit valve means actuable by the first drill means when the first drill means is in a fully retracted block disengaged position, and a seventh limit valve means actuable by the second drill means when the second drill means is in a fully retracted block disengaged position.

11. The invention of claim 10 wherein the control means includes means for operatively coupling the fourth limit valve means, the first drill moving means, the second drill moving means, side clamp moving means and the seventh limit valve means, whereby (1) the first drill moving means is prevented from moving the first drill means into the block engaging position when the seventh limit valve means is not actuated;

(2) the second drill moving means is actuated to move the second drill means into the block engaging position upon actuation of the fourth limit valve means by the first drill means, and (3) the side clamp moving means is actuated to move the side clamp means to the block disengaged position upon actuation of the seventh limit valve means by second drill means.

12. The invention of claim 1 wherein the second drill means includes (1) a second drill, and (2) a second drill mounting means including (a) a second drill stationary portion having a shaft means and (b) a second drill movable portion having means for slidably receiving the shaft means of the second drill stationary portion, the second drill movable portion being movable along the shaft means of the second drill stationary portion to guide the movement of the second drill between the block disengaged position and the block engaging position.

13. The invention of claim 12 wherein the shaft means of the second drill stationary portion is positioned to permit the second drill means to move in a line of between about 95 degrees to 115 degrees from a line of movement of the first drill means.

14. The invention of claim 12 wherein the control means includes a seventh limit valve means actuable by the second drill means when the second drill means is in a fully retracted, block disengaged position, and an eighth limit valve means actuable by the second drill means when the second drill means is in a fully extended, block engaging position, wherein, the seventh limit valve means is operatively coupled to the block advancing means for causing the block advancing means to begin movement toward the receiving area of the track, and is operatively coupled to the first drill moving means to prevent movement of the first drill means toward the block engaging position when the seventh limit valve means is not actuated.

15. The invention of claim 14 wherein the seventh limit valve is operatively coupled to the side clamp moving means, to cause the side clamp moving means to move the side clamp means out of the block engaged position in response to actuation of the seventh limit valve.

16. The invention of claim 1 wherein the first drill means includes a first router-type drill, and the second drill means includes a second router-type drill.

17. the invention of claim 1 wherein the control means comprises an air logic circuit, and each of the block moving advancing means, side clamp moving means, end plate moving means, first drill moving means and second drill moving means includes a pneumatic cylinder,

18. the invention of claim 1 wherein the generally vertical chute means has a cross sectional area sized to permit generally longitudinal movement of a block in the chute, but to generally inhibit lateral movement of a block in the chute, the second end of the vertical chute means is disposed in a spaced relation to the track to provide sufficient space between the track and the second end of the vertical chute means to permit the block advancing means to advance a block toward the operations area of the track and to pass between the second end of vertical chute means and the track.

19. The invention of claim 18 wherein the block advancing means includes a selectively actuable push rod means having a supine leg disposed generally parallel to the track, the supine leg having a generally planar upper surface upon which a block to be dispensed from the second end of the vertical chute means can rest when the block advancing means has advanced a dispensed block to the operations area of the track.

20. The invention of claim 1 wherein the control means includes a second limit valve means actuable by the block advancing means when the block advancing means is in a partially extended position, the second limit valve means being operatively coupled to the end plate moving means to cause the end plate moving means to move between the block engaging position to the block disengaged position to permit a block to be ejected from the track, and then back to the block engaging position.

21. A method for processing a block to form an elbow shaped tunnel therethrough, having a generally vertical portion and a generally horizontal portion, the method comprising the steps of (1) placing a plurality of pre-cut blocks into a chute means, (2) dispensing the blocks from an end of the chute means on to a track, (3) advancing the block to an operations area of the track with a block advancing means, (4) fixing the position of the block in the operations area of the track with a side clamp means, an end plate means, and the block advancing means (5) drilling a generally vertical bore through the block with a first drill means to form the generally vertical portion of the elbow-shaped tunnel, (6) drilling a generally horizontal bore through the block with a second drill means to form the generally horizontal portion of the elbow-shaped tunnel, (7) retracting the block advancing means to enable the block advancing means to move another block, (8) retracting the end plate means to permit the block to be ejected from the track, and (9) controlling the operation of the block advancing means, end plate means, side clamp means, first drill means and second drill means with a fluid logic circuit.

22. The method of claim 21 wherein the steps of controlling the operation of the block advancing means, first end plate means first drill means and second drill means includes the steps of (1) allowing the side clamp means to move into a block engaging position in response to movement of the block advancing means (2) prohibiting the first drill means to move into a block engaging position unless the second drill means is in a predetermined position.

23. The method of claim 22 wherein the step of controlling the operation of the block advancing means includes the steps of (1) causing the block advancing means to retract away from the operations area of the track in response to the position of the second drill means, and (2) causing the side clamp means to retract away from the operations area of the track, after a predetermined delay, in response to the position of the second drill means.

* * * * *

UNITED STATES PATENT AND TRADEMARK OFFICE
CERTIFICATE OF CORRECTION

PATENT NO. : 5,075,954

DATED : December 31, 1991

INVENTOR(S) : Pascal Fettig

It is certified that error appears in the above-identified patent and that said Letters Patent is hereby corrected as shown below:

1. Column 15, Claim 1; "(1) a track on which on which the block can travel,"..., should be "(1) a track on which the block can travel,"... .

2. Column 12, Line 10; "pneumatic cylinder 23"..., should be "pneumatic cylinder 236"... .

3. Column 13, Line 54; "24", should be "224".

Signed and Sealed this

Thirtieth Day of March, 1993

*Attest:*

STEPHEN G. KUNIN

*Attesting Officer*

*Acting Commissioner of Patents and Trademarks*